Oct. 22, 1929.  T. V. BUCKWALTER  1,732,256
AXLE BEARING SECURING MEANS
Filed Jan. 18, 1926
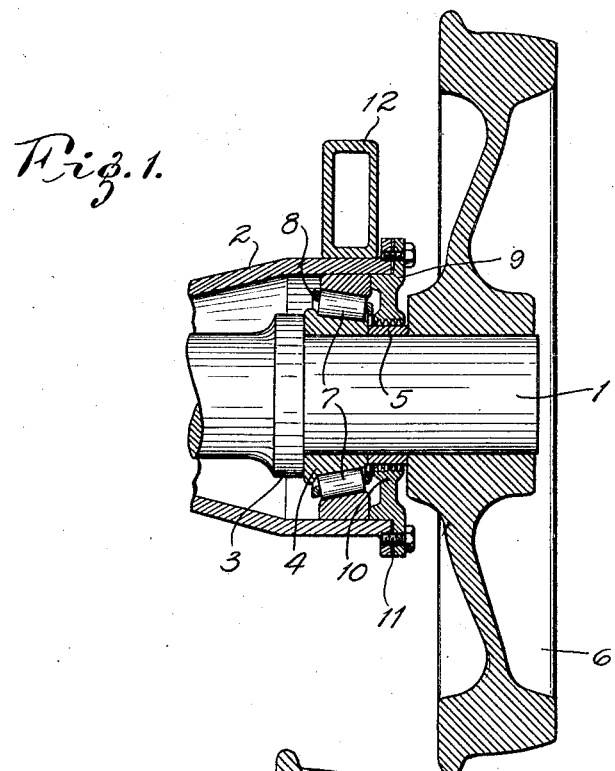
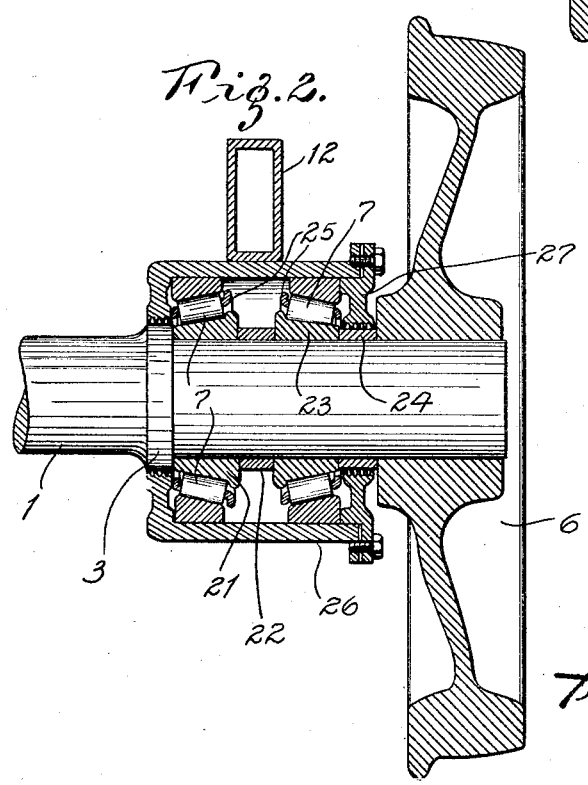
INVENTOR:-
Tracy V. Buckwalter
HIS ATTORNEYS.

Patented Oct. 22, 1929

1,732,256

UNITED STATES PATENT OFFICE

TRACY V. BUCKWALTER, OF CANTON, OHIO, ASSIGNOR TO THE TIMKEN ROLLER BEARING COMPANY, OF CANTON, OHIO, A CORPORATION OF OHIO

AXLE-BEARING-SECURING MEANS

Application filed January 18, 1926. Serial No. 81,935.

My invention relates to axle bearings, particularly bearings adapted for use in railroad cars and the like; and has for its object a simple and effective means for securing the bearings in position.

The invention consists principally in mounting the cone or inner bearing member against a shoulder on the axle and securing the wheel on the axle so as to abut against said cone or against an interposed spacer, thereby firmly locking said bearing cone between said shoulder and said wheel. The invention further consists in the axle bearing securing means and in the parts and combinations of parts hereinafter described and claimed.

In the accompanying drawing, which forms part of this specification,

Fig. 1 is a longitudinal sectional view of a railroad car axle bearing employing securing means embodying my invention; and Fig. 2 is a longitudinal sectional view of another form of the invention.

In the construction shown in Fig. 1, a single conical roller bearing is used at each end of each axle. The axle 1 is provided with a tubular housing 2 and the bearings are interposed between said axle and said tubular housing.

The axle 1 is provided with a shoulder 3 against which abuts the cone 4 or inner bearing member. Mounted on the axle 1 is a sleeve 5 that abuts against said cone 4 and the wheel 6 is pressed on the axle 1 and abuts against said spacer sleeve 5 (or, if desired, directly against the bearing cone 4). Since the wheel is fixed securely on the axle, the bearing cone is firmly held between the shoulder on the axle and the wheel.

The conical rollers 7 are mounted on said bearing cone 4 and the cup 8 therefor is inserted in the housing 2. The end of the housing is closed by a ring 9 that has an inwardly extending annular flange 10 that abuts against the bearing cup 8, and whose inner periphery fits closely around the spacer 5 to form a lubricant enclosure. Preferably said ring is spaced away from the end of the housing by shims 11, thus providing a means for adjusting the bearing cup. The truck side frames 12 rest on the ends of the axle housing 2.

In the construction shown in Fig. 2, two conical roller bearings are used at each end of the axle. The cone 21 of the innermost bearing abuts against the shoulder 3 on the axle 1, a spacer ring 22 is preferably interposed between said cone 21 and the cone 23 of the outermost roller bearing, and a sleeve 24 is interposed between said outermost cone 23 and the wheel 6. Thus the cones 21 and 23 and their spacer members 22 and 24 are securely held on the axle between the axle shoulder 3 and the wheel 6. The cups 25 are mounted in the bore of a journal box or housing 26. Closure members 27 are provided for the ends of said housing.

The above described construction securely positions the bearing cone or cones on the axle and prevents creeping thereof. At the same time, it provides for adjustment of the cups or outer bearing members to adjust for wear or looseness.

What I claim is:

1. In an axle bearing construction of the kind described, an axle, a shoulder thereon, a bearing cone abutting against said shoulder and disposed with its small end outward and a car wheel pressed on said axle so as to secure said bearing cone in position.

2. An axle bearing construction comprising an axle having a shoulder near the end thereof, a tubular housing for the end of said axle, a conical roller bearing interposed between said axle and said housing, the inner bearing member of said bearing abutting against said shoulder, a sleeve abutting against said inner bearing member, an annular closure member secured to said housing with its inner peripheral portion closely encircling said sleeve and a car wheel pressed on said axle and abutting against said sleeve, whereby said bearing member is securely held on said axle.

3. An axle bearing construction comprising an axle having a shoulder near the end thereof, a housing for the end of said axle, conical roller bearings interposed between said axle and said housing, the inner bearing member of one of said bearings abutting against said shoulder and a car wheel pressed on said axle in position to hold said bearings on said axle, the inner bearing member adjacent to said car wheel being disposed with its small end outward.

Signed at Canton, Ohio, this 12th day of January, 1926.

TRACY V. BUCKWALTER.